United States Patent [19]
Yamaoka

[11] Patent Number: 5,086,649
[45] Date of Patent: Feb. 11, 1992

[54] MOUNTING STRUCTURE FOR LOAD SENSOR IN AUTOMOTIVE SUSPENSION SYSTEM

[75] Inventor: Fumiyuki Yamaoka, Kanagawa, Japan

[73] Assignee: Atsugi Unisia Corporation, Kanagawa, Japan

[21] Appl. No.: 643,503

[22] Filed: Jan. 22, 1991

[30] Foreign Application Priority Data

Jan. 24, 1990 [JP] Japan .................... 2-5970[U]

[51] Int. Cl.⁵ .................................... G01M 19/00
[52] U.S. Cl. .................................... 73/118.1
[58] Field of Search ........... 73/118.1, 862.62, 862.64, 73/862.65, 862.66; 180/41

[56] References Cited

U.S. PATENT DOCUMENTS

| | | | |
|---|---|---|---|
| 4,103,532 | 8/1978 | Buzzi | 73/11 |
| 4,800,751 | 1/1989 | Kobayashi et al. | 73/118.1 |

FOREIGN PATENT DOCUMENTS

| | | |
|---|---|---|
| 64-60411 | 3/1989 | Japan. |
| WO88/08491 | 11/1988 | PCT Int'l Appl. |
| 881986 | 11/1961 | United Kingdom. |
| 1255042 | 11/1971 | United Kingdom. |

*Primary Examiner*—Jerry W. Myracle
*Attorney, Agent, or Firm*—Ronald P. Kananen

[57] ABSTRACT

A mounting structure for a load sensor includes a load sensor which is designed to be mounted on a suspension member which causes distortion in response to input load. The load sensor is oriented on the suspension member in a position below the position where the suspension member is connected to a sprung mass.

8 Claims, 3 Drawing Sheets

MOUNTING STRUCTURE FOR LOAD SENSOR IN AUTOMOTIVE SUSPENSION SYSTEM

BACKGROUND OF THE INVENTION

1. Field of the Invention

The present invention relates generally to a mounting structure for a load sensor disposed between a sprung mass and an unsprung mass for monitoring load transferred therebetween and thereby monitoring the relative speed of the sprung mass and unsprung mass.

2. Description of the Background Art

Japanese Patent First (unexamined) Publication (Tokkai) Showa 64-60411 discloses a mounting structure for a load sensor in an automotive suspension system. In the shown construction, the load sensor is disposed between the top end and an upper mount insulator. Therefore, the load sensor is oriented in series with the piston rod.

In such prior proposed construction, the load sensor is subject to tightening torque and weight of the sprung mass, i.e. a vehicular body as set load. Therefore, maximum distortion becomes excessive to cause degradation of the accuracy of the monitored result. Furthermore, since the load sensor may be subject to a substantial load, the stiffness and strength of the load sensor per se has to be sufficiently great. On the other hand, these characteristics make it difficult to obtain a sufficient magnitude of distortion in response to the input load. This also serves as a cause of degradation of the accuracy of the monitored results.

SUMMARY OF THE INVENTION

Therefore, it is an object of the present invention to provide a mounting structure for a load sensor, in which a set load exerted on the load sensor can be minimized for enhancing accuracy in monitoring of the load transferred between the sprung mass and the unsprung mass of a suspension system.

In order to accomplish the aforementioned and other objects, a mounting structure for a load sensor, according to the present invention, includes a load sensor which is designed to be mounted on a suspension member which causes distortion in response to an input load. The load sensor is oriented on the suspension member in a position below the position where the suspension member is connected to a sprung mass.

According to one aspect of the invention, a mounting structure for a load sensor in an automotive suspension comprises:

a suspension component forming a part of the suspension system disposed between a sprung mass and an unsprung mass, the suspension component being disposed in a route of transmission of the load between the sprung mass and the unsprung mass; and a load sensor mounted on the suspension component at an orientation axially offset from the position of the suspension component at which the suspension component is interconnected to the sprung mass, and secured in place by means of a threaded means.

The load sensor may be formed into an essentially cylindrical construction so that it can be fitted onto the outer periphery of the cylindrical suspension component at an orientation downwardly offset from the top end where the suspension component is mechanically connected to the sprung mass. In the preferred construction, the load sensor comprises a ring-shaped sensor body and a strain gauge attached onto the sensor body. Moreover, preferably the sensor body is formed with a thin wall section for causing distortion in response to the input load, and the strain gauge is mounted on the thin wall section.

In an alternative embodiment, the load sensor may comprise a ring-shaped piezoelectric element.

The load sensor may be maintained at the orientation by means of a lower retaining means and an upper retaining means which are cooperative to each other to restrict axial movement of the load sensor, and the upper retaining means incorporating the threaded means. In such case, the upper retaining means may apply an initial set load by tightening the torque of the threaded means. Preferably, the set load is adjusted so that the load to be exerted on the load sensor becomes zero at a tensile load where the maximum damping force in a rebounding stroke is generated.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
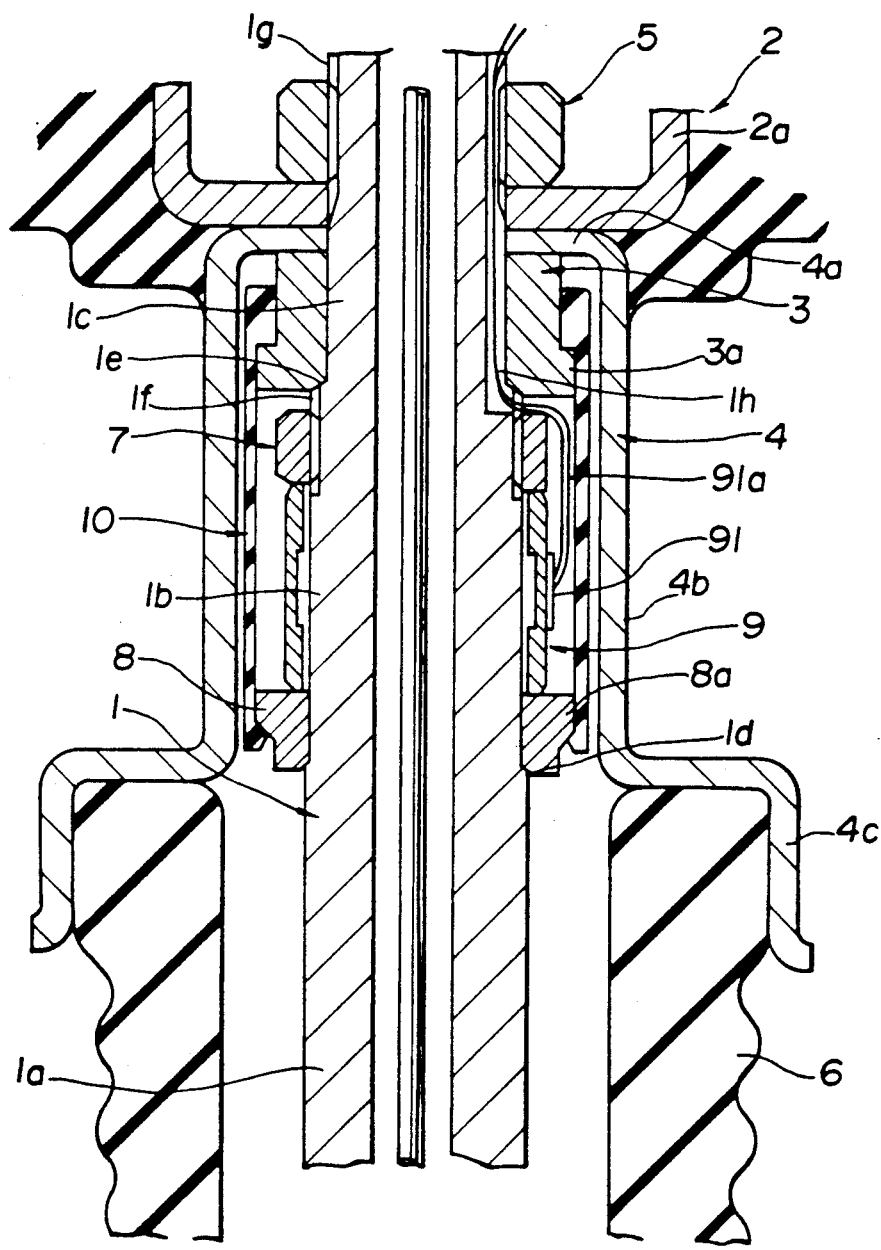
FIG. 1 is a section showing the major part of an automotive suspension system, for which the preferred embodiment of mounting structure for a load sensor, according to the present invention, is applied.

Referring now to the drawings, particularly to FIG. 1, the preferred embodiment of a mounting structure of a load sensor 9 to a vehicular suspension system in terms of one of typical construction of the suspension system which includes a shock absorber with a piston rod 1. The top end portion of the piston rod 1 is connected to a vehicular body (not shown) as a sprung mass via an upper mount insulator 2.

As seen from FIG. 1, the piston rod 1 has a larger diameter major section 1a, a smaller diameter top end section 1c and an intermediate section 1b oriented between the major section 1a and the top end section 1c. The intermediate section 1b includes two stage steps 1d and 1e. An upper bushing 3 and a bumper rubber mounting bracket 4 are mounted on the top end section 1c. The top end section 1c, carrying the upper bushing 3 and the bumper rubber mounting bracket 4, is inserted through a bracket 2a of the upper insulator 2. The bracket 2a of the upper insulator 2 is fixed onto the top end section 1c by means of a fastening nut 5 engaging with a thread 1g formed on the outer periphery of the top end section.

The bumper rubber mounting bracket 4 has an essentially disc-shaped end plate 4a which is disposed between the bracket 2a of the upper bushing 2 and the upper bushing 3 and fastened together with the bracket 2a by the fastening nut 5. The bumper rubber mounting bracket 4 has a smaller diameter cylindrical extension 4b extending from the outer circumferential edge of the end plate 4a and a larger diameter cylindrical extension 4c. A bumper rubber 6 is mounted on the larger diameter cylindrical section 4c.

A lower bushing 8 has a diameter essentially conforming with the external diameter of the intermediate section 1b of the piston rod 1. The lower bushing 8 is seated on the step 1d to prevent further axial movement. A cylindrical load sensor 9 is mounted on the lower bushing 8. The axial movement of the load sensor 9 is restricted by means of a fastening nut 7 engaging with a threaded portion 1f at the intermediate shaft section 1b.

Figure 2:
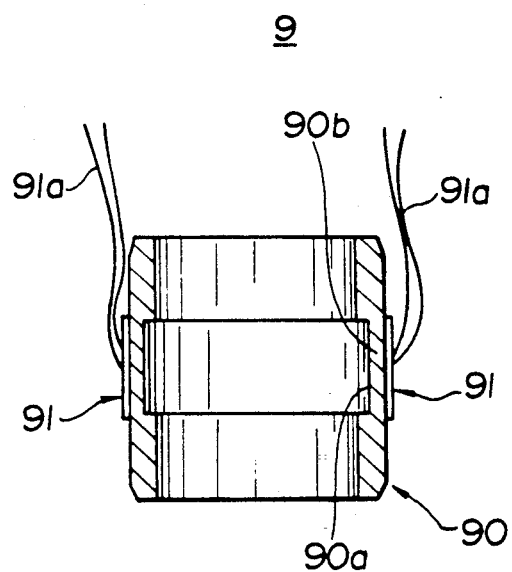
FIG. 2 is a section of the preferred embodiment of a load sensor according to the invention.

As shown in FIG. 2, the load sensor 9 is formed into an essentially cylindrical or ring-shaped configuration. The load sensor 9 comprises a sensor body 90 and a strain gauge 91. The sensor body 90 is formed essentially into a cylindrical construction. An annular groove 90a is formed on the inner periphery of the sensor body to define a thinner wall section 90b. This thinner wall section 90b serves as load sensitive distorting section to cause distortion in response to the stress exerted thereto. The strain gauge 91 is mounted at the thinner wall section 90b to monitor the magnitude of distortion and thereby monitors the load exerted on the piston rod 1. The strain gauge 91 is connected to an external circuit via a wire harness 91a. As is clear from FIG. 1, the harness 91a extends through an axial groove 1h formed at the top end section 1c of the piston rod 1.

The upper bushing 3 has a radial extension 3a. On the other hand, the lower bushing 8 also has a radial extension 8a. An elastic dust cover 10 has both ends engaging with the radial extensions 3a and 8a of the upper and lower bushings 3 and 8. As can be seen from FIG. 1, the dust cover 10 extends over the section of the piston rod where the load sensor is mounted. Therefore, the load sensor 9 can be protected from dust, dirt or so forth.

For assembling the load sensor 9 to the piston rod 1, the load sensor is assembled to the piston rod and mounted on the lower bushing 8. After assembling the load sensor 9, the fastening nut 7 is engaged to the threaded portion 1f. Then, the fastening nut 1f is tightened for fixingly securing the load sensor 9 to the piston rod 1. By tightening the torque of the fastening nut 1f, a pre-load is exerted onto the load sensor 9. This preload serves as a set load of the sensor. With the set load, the sensor body 90 and the strain gauge 91 are initially distorted. Therefore, the strain gauge 91 produces an initial level of output.

After thus assembling the load sensor onto the piston rod 1, the upper bushing 3 and a dust cover 10 are assembled. Then, the top end portion 1c of the piston rod 1 is inserted and assembled with the upper mount insulator 2 and fastened by means of the fastening nut 5.

As can be appreciated herefrom, in the shown embodiment, the load sensor 9 is mounted and secured by means of the fastening nut 7 independent of the fastening nut 5 which fastens the upper mount insulator 2. Therefore, the load sensor 9 can be maintained free from the initial load exerted on the upper mount insulator 2.

Figure 3:
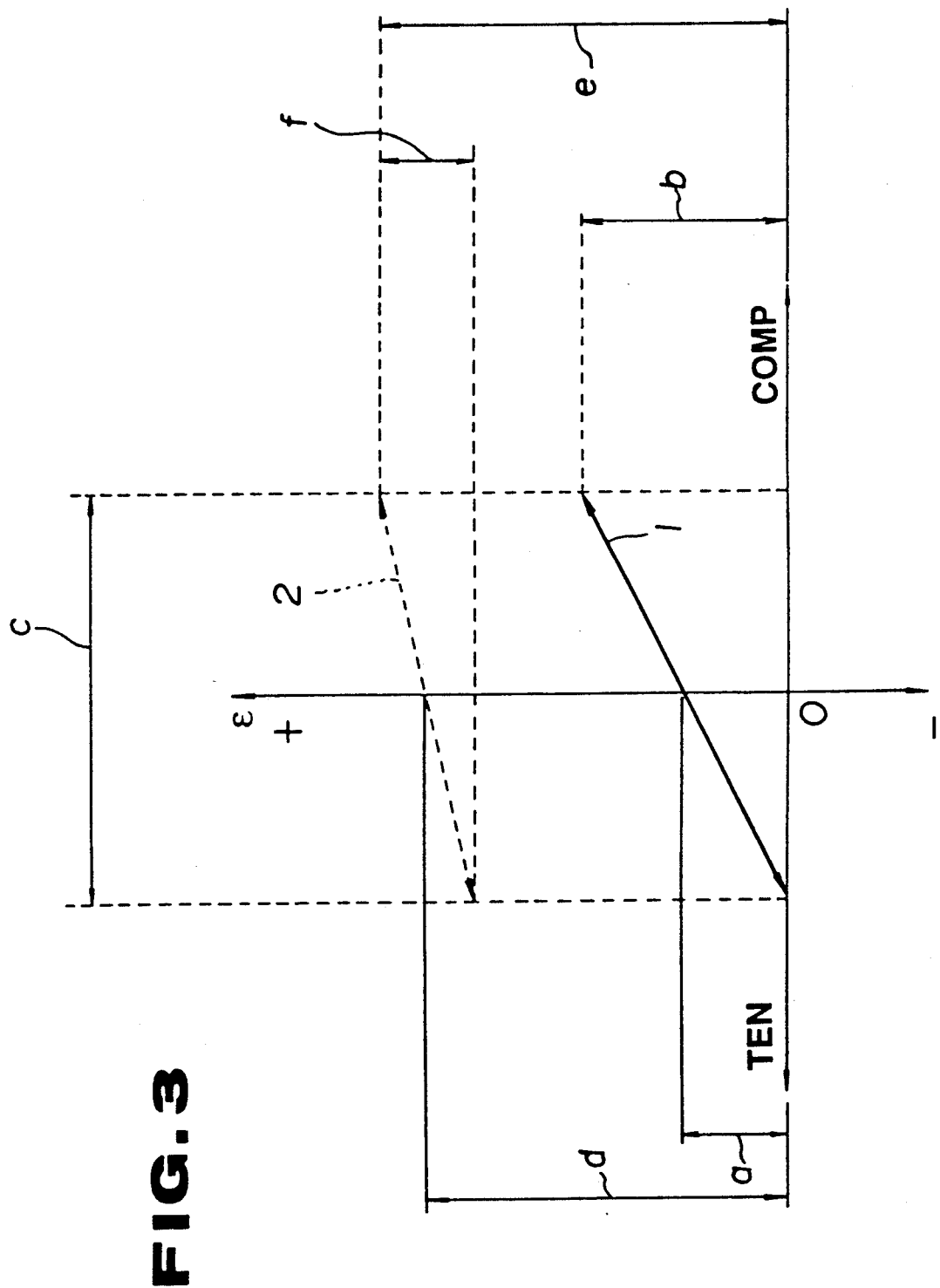
FIG. 3 is a graph showing a relationship between an input load and distortion at the load sensor.

FIG. 3 shows distortion characteristics of the shown embodiment of the load sensor 9. In FIG. 3, the left side across the ordinates axis in the abscissa's axis represents tension load and the right side represents compression load. On the other hand, the upper side across the abscissa's axis in the ordinate axis represents a magnitude $\epsilon$ of compression side distortion and the lower side represents tension side distortion. In the chart of FIG. 3, the line 1 represents the distortion characteristics of the load sensor according to the invention and the line 2 represents the distortion characteristics of the conventional load sensor.

As can be clear from FIG. 3, the initial distortion a in the preferred embodiment of the load sensor is much smaller than that of distortion d in the conventional one. On the other hand, since the stiffness or strength of the load sensor 9 according to the present invention can be set much smaller than that in the conventional sensor, the distortion magnitude of the preferred embodiment of the load sensor can be much greater than that of the conventional load sensor. Therefore, the range of distortion b of the preferred embodiment of the load sensor is much greater than that of distortion f in the conventional load sensor. Furthermore, the maximum distortion b of the preferred embodiment of the load sensor is much smaller than that of distortion b of the conventional load sensor despite a much greater distortion range b.

In the shown embodiment, the magnitude of initial distortion a is set so as to cancel the maximum tensile distortion at the maximum damping force in the piston rebounding or expansion stroke. Namely, the magnitude of the distortion in the preferred embodiment of the load sensor becomes zero at the occurrence of the maximum damping force.

When compression load is exerted on the piston rod to cause a piston bounding stroke motion, the compressing force is exerted on the piston rod for reducing the distance between the nut 7 and the lower bushing 8 to cause compression distortion on the piston rod. According to this, a compression force is transferred to the load sensor to cause distortion thereof. Therefore, the magnitude of the compression side distortion at the load sensor becomes greater than the initial distortion a. Therefore, the output level of the load sensor is increased according to increasing the increase of compression side distortion. On the other hand, when tensile load is exerted on the piston rod, tensile distortion is caused to expand the distance between the nut 7 and the lower bushing 8. This reduces the set load exerted on the load sensor to reduce the magnitude of distortion in the load sensor. As a result, the output level of the strain gauge 91 of the load sensor 9 can be reduced.

Therefore, as can be appreciated herefrom, the shown embodiment of the load sensor according to the present invention, can provide a greater magnitude of variations of the output level from the strain gauge in comparison with that of the conventional load sensor. Furthermore, since the shown embodiment of the load sensor is free from the load of the vehicular load, smaller less strength or stiffness is required for the sensor body. Therefore, the load sensor can be distorted at a greater magnitude for a greater output level in comparison with that in the conventional load sensor. To the contrary, as set forth, since the preferred embodiment of the load sensor can be held free from the vehicular body load, initial distortion in response to the set load can be smaller than that of the conventional sensor. Therefore, the maximum distortion to be caused on the load sensor can be maintained in a much smaller magnitude than that of the conventional load sensor. As a result, the accuracy of the load measurement can be significantly enhanced.

Furthermore, since the shown embodiment of the load sensor employs a strain gauge 91 in place of a piezoelectric element, the load measurement in the low frequency range becomes possible.

While the present invention has been discussed hereabove in terms of the preferred embodiment of the invention, the invention should be appreciated to be restricted for the shown embodiment. The invention can be embodied in various fashions. Therefore, the invention should be interpreted to include all possible embodiments and modifications which can be embodied without departing from the principle of the invention set out in the appended claims.

Figure 4:
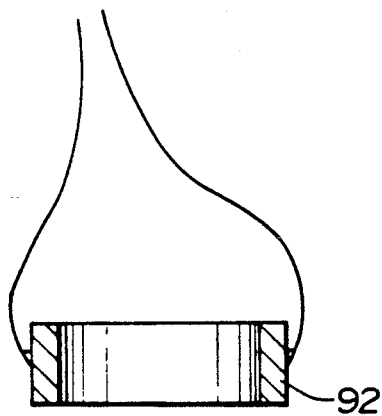
FIG. 4 is a modified embodiment of the load sensor according to the invention.

For example, though the shown embodiment of the load sensor is mounted on the piston rod, it may be possible to mount the load sensor at any of the suspension members which is subject to input load and causes distortion. For instance, in the suspension system which employs a reverse type damper having a damper cylinder connected to the vehicular body, the load sensor may be mounted on the damper cylinder. Also, the load sensor may be mounted on the height adjusting element in the suspension system with a height adjustment function. Furthermore, though the shown embodiment is set so that the set load on the load sensor at the maximum damping force in the rebounding stroke becomes zero, it is, of course, possible to vary the set load to cause tensile distortion at the maximum damping force in the rebounding stroke. Naturally, in such case, the initial distortion becomes smaller than that set forth above. Therefore, maximum compression side distortion will become still smaller. In addition, although the piezoelectric element may cause difficulty in monitoring the load at a low frequency range of vibration, it may be possible to use a ring-shaped piezoelectric load sensor 92 as shown in FIG. 4.

What is claimed is:

1. A mounting structure for a load sensor in an automotive suspension comprising:

a suspension component forming a part of a suspension system disposed between a sprung mass and an unsprung mass, said suspension component being disposed in a route of transmission of a load between said sprung mass and said unsprung mass; and a load sensor mounted on said suspension component at an orientation axially offset from the position of said suspension component at which said suspension component is interconnected to said sprung mass, and secured in place by means of a threaded means.

2. A mounting structure as set forth in claim 1, wherein said load sensor is formed into an essentially cylindrical construction so that it can be fitted onto the outer periphery of a cylindrical suspension component at an orientation downwardly offset from the top end where the suspension component is mechanically connected to the sprung mass.

3. A mounting structure as set forth in claim 2, wherein said load sensor comprises a ring-shaped sensor body and a strain gauge attached onto the sensor body.

4. A mounting structure as set forth in claim 3, wherein said sensor body is formed with a thin wall section for causing distortion in response to the input load, and said strain gauge is mounted on said thin wall section.

5. A mounting structure as set forth in claim 2, wherein said load sensor comprises a ring-shaped piezoelectric element.

6. A mounting structure as set forth in claim 2, wherein said load sensor is maintained at said orientation by means of a lower retaining means and an upper retaining means which are cooperative to each other to restrict axial movement of said load sensor, and said upper retaining means incorporating said threaded means.

7. A mounting structure as set forth in claim 6, wherein said upper retaining means applies an initial set load by tightening the torque of said threaded means.

8. A mounting structure as set forth in claim 7, wherein said set load is adjusted so that the load to be exerted on said load sensor becomes zero at a tensile load where the maximum damping force in a rebounding stroke is generated.

* * * * *